June 21, 1949.　　　H. H. GOLDSTAUB　　　2,473,876
SLIDE RULE
Filed April 22, 1946
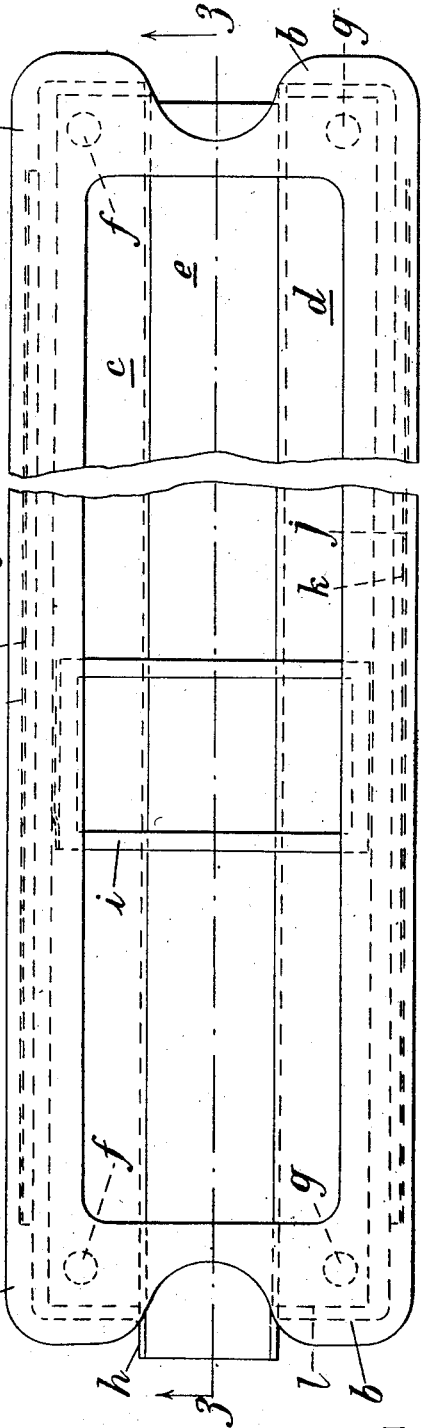
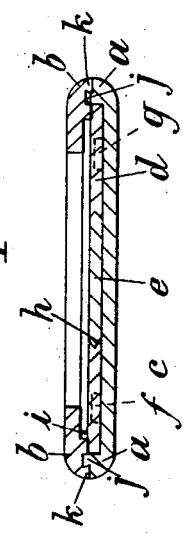
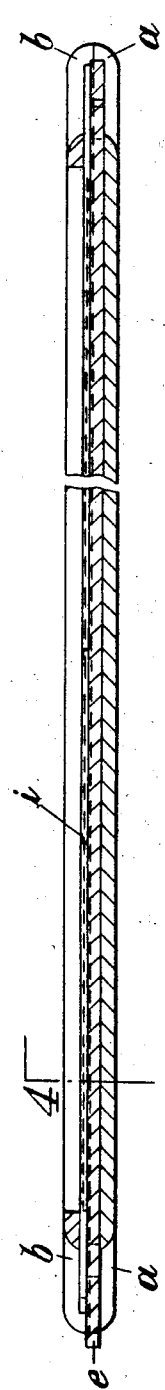
Inventor
H. H. Goldstaub Patented June 21, 1949

2,473,876

UNITED STATES PATENT OFFICE 2,473,876

SLIDE RULE

Heinz Herbert Goldstaub, Snaresbrook, England

Application April 22, 1946, Serial No. 663,866
In Great Britain April 30, 1945

3 Claims. (Cl. 235—70)

This invention relates to slide rules or calculating apparatus of the flat rectilinear type herein mainly referred to as slide rules or the like.

The object of the invention is to provide an improved slide rule or the like as referred to above mainly from the aspect of small cost of material and assembly of parts, while yielding a rule of convenient and acceptable form without detriment to efficiency particularly, though not exclusively, a rule which may conveniently be carried in the pocket for quick reference.

The invention in brief consists in a slide rule or calculating apparatus of the flat rectilinear type comprising a non-metallic case formed from material of the group commonly known as plastics, and preferably a thermo-setting resin, together with suitably marked interlocking fixed and sliding parts made of any convenient material, for example, of Celluloid or metal, the case being of two or more interconnected and preferably snap-fastened parts, which after locking retain the scale parts in position with the necessary degree of operational freedom.

The invention also consists in a slide rule or calculating apparatus in accordance with the preceding paragraph provided with a cursor fitting over the scales but within the casing.

The invention also consists in improved slide rules or calculating apparatus constructed substantially as herein described with reference to the accompanying drawings.

In the accompanying drawings:

Figure 1 is a plan view from above of one form of slide rule according to the present invention;

Figure 2 is an end view of Figure 1 looking on the right thereof;

Figure 3 is a section on Figure 1, the line 3—3 thereof looking in the direction of the arrow, and Figure 4 is a section on the line 4—4 of Figure 3 looking in the direction of the arrow.

In carrying the invention into effect in the form illustrated by way of example a slide rule is constructed of the following main parts, namely, a casing comprising a bottom shell $a$ and a top shell $b$, three scales $c$, $d$ and $e$, two of which, namely $c$ and $d$, are located in position by means of pins $f$ and $g$ in the bottom shell of the casing as fixed scales, and a third $e$ slidable with reference to the former two scales, but having a tongue and groove or like correlation $h$ with those scales, so that although it can be moved longitudinally, it is always locked to the fixed scales $c$ and $d$. A cursor $i$ is also provided fitting over the scales but preferably within the casing, that is to say, between the bottom and top shells $a$ and $b$ respectively.

If desired, a protective covering may be applied over the scales but beneath the cursor held also in place by the sections forming the casing.

The casing sections or shells $a$ and $b$ are preferably formed of a thermo-setting resinous plastic material, and have corresponding projections $j$ and recesses $k$ preferably slightly undercut in order that the two shells may be assembled and pressed together by thumb pressure, snapping into position and remaining there through a long snap extending practically the whole length of the rule. The scales are firmly held in position by landings $l$ formed on the top shell. The top shell has a window $m$ for inspection of the scales.

The invention is not limited to the particular example described.

I claim:

1. In a slide rule, a bottom shell formed of moulded material, a top shell formed of moulded material, a projection carried by and extending lengthwise of one of said shells, the other shell having a recess therein extending lengthwise of the shell, said projection and a wall of said recess both being undercut to interengage and maintain the shells in assembled relationship.

2. In a slide rule an elongated moulded casing section having a window therein, a second elongated moulded casing section, said first casing section having elongated recesses therein with a sidewall of each recess undercut, and ribs projecting from the second casing section extending lengthwise thereof adapted to snap into said recesses and maintain the casing sections in assembled relationship.

3. In a slide rule according to claim 2 wherein scales are carried between the two casing sections, and a longitudinally slidable scale mounted between the first scales.

HEINZ HERBERT GOLDSTAUB.

REFERENCES CITED

The following references are of record in the file of this patent:

UNITED STATES PATENTS

| Number | Name | Date |
|---|---|---|
| 1,398,914 | Pierce | Nov. 29, 1921 |
| 1,875,927 | Keuffee | Sept. 6, 1932 |
| 2,294,199 | Morse | Aug. 25, 1942 |